(No Model.)

E. R. WHITNEY.
ELECTRIC WIRE SUPPORT AND CUT-OUT.

No. 448,468. Patented Mar. 17, 1891.

Witnesses:
Jas. J. Maloney
W. E. Hill

Inventor,
Edwin R. Whitney
by Jos. P. Livermore
Att'y

UNITED STATES PATENT OFFICE.

EDWIN R. WHITNEY, OF MANCHESTER, NEW HAMPSHIRE, ASSIGNOR TO THE ELECTRICAL SUPPLY MANUFACTURING COMPANY, OF SAME PLACE.

ELECTRIC-WIRE SUPPORT AND CUT-OUT.

SPECIFICATION forming part of Letters Patent No. 448,468, dated March 17, 1891.

Application filed November 4, 1890. Serial No. 370,333. (No model.)

*To all whom it may concern:*

Be it known that I, EDWIN R. WHITNEY, of Manchester, county of Hillsborough, State of New Hampshire, have invented an Improvement in Electric-Wire Supports and Cut-Outs, of which the following description, in connection with the accompanying drawings, is a specification, like letters on the drawings representing like parts My invention is embodied in a device adapted to be fastened upon the wall or ceiling of an apartment or building for the purpose of holding electric-supply wires to the wall of the structure, and also for making electrical connection from the said supply-wires to a branch or wire containing a device to be supplied with the electric current from the said main supply-wire.

The wire-holder forming the subject of this invention is composed of a base portion adapted to be permanently secured to the wall and provided with seats to receive the main wires and with means for fastening a removable cross-bar or cap to said base, which removable cap contains clamps to receive the terminals of the supplied branch and yielding contact-pieces, which are electrically connected with said clamps through the usual easily-fusible connectors, and which, when the said cap is fastened to the base, engage with the main leads, so as to securely hold them in their seats on the base-piece, and also so as to afford a good electrical contact for conveying the current from the main leads to the supplied branch.

Figure 1:
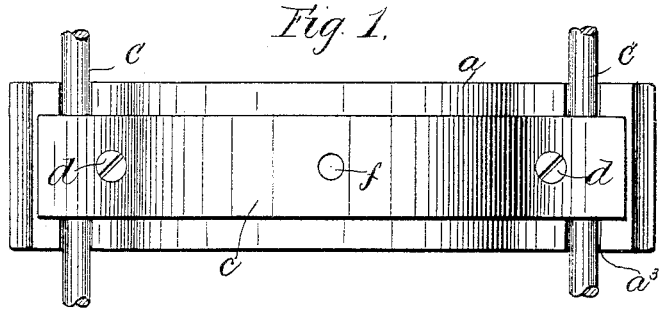
Figure 2:
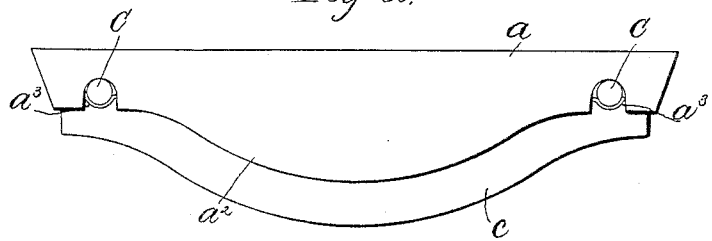
Figure 3:
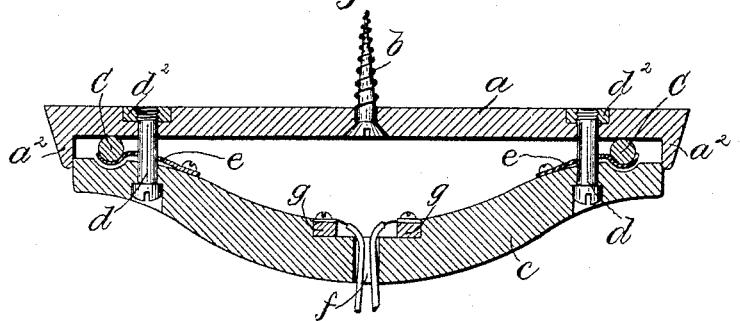
Figure 4:
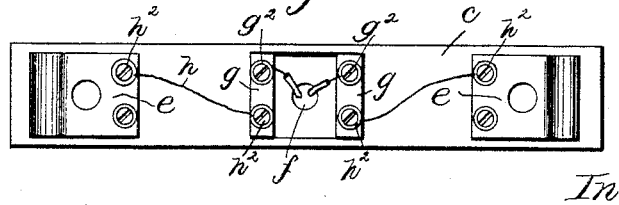

Figure 1 is a plan view of an electric-wire holder, connector, and cut-out embodying this invention; Fig. 2, a side elevation thereof; Fig. 3, a longitudinal section, and Fig. 4 an elevation of the inner face of the cap portion detached.

The device comprises a base portion $a$, which may be of porcelain or other suitable material, which should be non-conducting and preferably non-combustible, the said base-piece being adapted to be connected with the wall or ceiling of the building by means of a screw $b$ or otherwise. The said base-piece is shown as substantially rectangular in shape and provided with a flange $a^2$ extending all around the same to receive a removable cap $c$, which is preferably also composed of the same material as the cap $a$. Near the ends of the base $a$ the flange $a^2$ is notched or recessed, as shown at $a^3$, to afford seats for the main conducting wires C, which are securely fastened in the said seat by the cap $c$, when the latter is connected with the base-piece. The connection of the cap with the base-piece is shown as effected by screws $d$ passing through the cap near its ends and screwed into suitable nuts or threaded sockets $d^2$, fixed in a base $a$ in proper position to receive said screws. In order to securely hold the main wires C, and also to make separate electrical connections from each, the ends of the cap C are provided with spring-bearing pieces $e$, securely fastened to the ends of the said cap and properly shaped to bear upon a considerable portion of the surface of the main wire with a spring-pressure, which is developed as the cap is screwed to place by the caps $d$. The cap $c$ is provided near its middle with an opening $f$ to receive the ends of the branch wire to which the current is to be applied from the main leads C, and at each side of the said opening $f$ are conducting-pieces $g$, provided with binding screws or clamps $g^2$ to receive and make electrical connection with the terminals of the branch wire. The said conducting-pieces $g$ are respectively connected with the clamps $e$ by the usual safety-wires $h$, which are easily fusible, and consequently give way under the head developed in case an abnormally great current is thrown into the branch, thereby severing the branch from the main leads. The safety-wire $h$ is connected with the parts $g$ and $e$ by clamps or binding-screws $h^2$, and may easily be applied when the cap is unfastened and removed from the base-piece. The flange $a^2$ of the base-piece practically surrounds and embraces the cap $c$, so that the latter is securely held in the base-piece and all the electrical connections are inclosed within the space between the base and cap, leaving no conducting portion that is in connection with the current-supplying conductors exposed at the outside of the instrument.

I claim—

1. The combination of the base-piece having a surrounding flange provided with main-wire seats, combined with a removable cap adapted to enter within the said flange and to be secured to the said base-piece, said cap having yielding clamps for engaging the wires in the seats on the base-piece, substantially as described.

2. The combination of the base-piece provided with wire-seats, with a removable cap having spring-clamps near its ends to engage the wires in the wire-seats of the base, and wire-holding clamps adapted to be connected with said spring-clamps by easily-fusible conductors, substantially as described.

In testimony whereof I have signed my name to this specification in the presence of two subscribing witnesses.

EDWIN R. WHITNEY.

Witnesses:
 N. P. HUNT,
 H. M. PUTNEY.